United States Patent [19]

Doering et al.

[11] Patent Number: 5,391,414
[45] Date of Patent: Feb. 21, 1995

[54] DISKETTES HAVING CROSSLINKED ADHESIVE BOND TO HUB

[75] Inventors: Arlin Doering, South St. Paul; Clayton A. George, Woodbury, both of Minn.

[73] Assignee: Minnestoa Mining and Manufacturing Company, St. Paul, Minn.

[21] Appl. No.: 947,731

[22] Filed: Sep. 21, 1992

[51] Int. Cl.⁶ .............................................. B32B 3/00
[52] U.S. Cl. ......................................... 428/64; 428/65; 428/913; 430/270; 430/945; 346/135.1
[58] Field of Search .......................... 428/64, 65, 913; 430/270, 945; 346/76 C, 135.1

[56] References Cited

U.S. PATENT DOCUMENTS

| | | | |
|---|---|---|---|
| 3,675,015 | 7/1992 | Gells | 250/711 B |
| 3,930,063 | 12/1975 | Miller et al. | 427/54 |
| 3,956,630 | 5/1976 | Mellows | 250/362 |
| 4,250,382 | 2/1981 | Libby | 250/362 |
| 4,445,157 | 4/1984 | Takahashi | 360/133 |
| 4,634,617 | 1/1987 | Ohta et al. | 428/65 |
| 4,737,559 | 4/1988 | Kellen et al. | 526/291 |
| 4,797,764 | 1/1989 | Doering | 360/135 |
| 4,897,134 | 1/1990 | Doering | 156/73.1 |
| 4,922,113 | 5/1990 | Melancon | 250/372 |
| 5,047,444 | 9/1991 | DeVoe et al. | 522/99 |
| 5,128,386 | 7/1992 | Rehmer et al. | 522/35 |
| 5,141,989 | 8/1992 | Jung et al. | 524/561 |
| 5,167,996 | 12/1992 | Kurisu et al. | 428/64 |
| 5,315,579 | 5/1994 | Hector et al. | 369/290 |

FOREIGN PATENT DOCUMENTS

| | | |
|---|---|---|
| 4200472 | 7/1992 | Germany. |
| 57-143369 | 9/1982 | Japan. |
| 63-069081 | 3/1988 | Japan. |
| 1211342 | 8/1989 | Japan. |
| 3001382 | 1/1991 | Japan. |
| 3149273 | 6/1991 | Japan. |

OTHER PUBLICATIONS

Encyclopedia of Polymer Science and Engineering, vol. 1, A. Wiley–Interscience Publication, John Wiley & Sons, pp. 548–549.
Handbook of Adhesive Bonding, Charles V. Cagle, 1973 McGraw-Hill Company, pp. 8-1–8-10.
Fuji MF2DD and 2HD Diskette box graphics circa Apr. 1992.

*Primary Examiner*—Patrick J. Ryan
*Assistant Examiner*—Elizabeth Evans
*Attorney, Agent, or Firm*—Gary L. Griswold; Walter N. Kirn; Susan Moeller Zerull

[57] ABSTRACT

A magnetic recording disk that includes an annular recording medium disk bonded to a hub with a pressure sensitive adhesive. The pressure sensitive adhesive bonds the disk to a flange portion of the hub. The present invention also includes a method of bonding an annular recording medium disk to a hub, comprising the steps of: providing a crosslinkable hot-melt adhesive containing a fluorescent dye; applying a quantity of the crosslinkable adhesive to the hub at a specified application temperature; and using a light detector to measure the amount of adhesive on the hub.

8 Claims, 1 Drawing Sheet

DISKETTES HAVING CROSSLINKED ADHESIVE BOND TO HUB

TECHNICAL FIELD

This invention is in the field of magnetic recording media disks, particularly magnetic recording media disks having hubs. A medium is mounted on a circular hub to form the disk. The disk is contained in a case or cartridge and is known by various designations such as micro-diskette, micro-floppy disk, floppy disk, or compact floppy disk.

BACKGROUND

Magnetic recording medium diskettes, or disks having hubs, generally consist of three elements: an annular recording medium disk, a flanged metal hub, and an adhesive that secures the medium to the flange of the hub. The recording medium is made of a flexible magnetic sheet material that has a typical thickness of about 0.075 mm. The hubs may be stamped from a metal sheet or molded from a thermoplastic with a magnetic insert. The hub has a center portion and a recessed flange portion. The center portion fits through a central aperture in the medium, with the medium resting on the flange portion. An adhesive in between the medium and flange secures the medium to the flange.

The predominant method for the manufacture of hubbed disks is to a place a two-sided pressure-sensitive ring (A-ring) between the medium and hub to secure the medium to the hub. See, e.g., U.S. Pat. No. 4,445,157. Because both sides of the A-ring are a pressure sensitive adhesive, release liners are typically required on each side of the ring prior to the use of the A-ring. There are processing difficulties inherent in the removal of the release liners prior to use, as well as cost and waste concerns in the use of the release liners.

A-rings are typically stamped from a sheet of pressure sensitive adhesive that has a release liner on each side. The adhesive portion removed to form the annular opening of the A-ring, and the adhesive portion that surrounds the A-ring, are discarded after the A-rings are cut from the sheets. The waste and cost inherent in this manufacturing procedure of A-rings is undesirable.

It is important to have an adhesive bond between the hub and medium that does not shift or creep under conditions of use, such as torque shear. As the density of the information stored on magnetic media increases, and the number of tracks on a disk increases, shear resistance becomes increasingly important. Even very small shifts in the relationship between the hub and media can cause the media to fail in its use in reading or recording data. Accordingly, it is important that the adhesive used to bond the hub to the medium have excellent shear resistance characteristics.

DISCLOSURE OF THE INVENTION

This invention provides a new diskette including an annular recording medium disk bonded to a hub with a pressure sensitive adhesive (PSA). The disk has a top surface and a bottom surface. The pressure sensitive adhesive bonds the disk to a flange portion of the hub. Suitable pressure-sensitive adhesives include: a crosslinked pressure-sensitive adhesive comprising the crosslinked reaction product of A and a crosslinking agent, for example PX, wherein: A is a monomeric acrylate or methacrylate ester of a non-tertiary alcohol or a mixture of non-tertiary alcohols, the alcohols having from 1 to 14 carbon atoms, with the average number of carbon atoms being about 4 to 12, and PX is a copolymerizable mono-ethylenically unsaturated aromatic ketone monomer substantially free of ortho-aromatic hydroxyl groups; the copolymer being crosslinked by means of PX or other suitable crosslinking agent, wherein PX is present in an amount of about 0.025% to about 1.0% by weight of the copolymer, preferably, about 0.1–0.5% by weight. The copolymer has an inherent viscosity measured in ethyl acetate solvent of from about 0.3 deciliters per gram (dl/g) to 1.0 dl/g, preferably about 0.5 dl/g to about 0.7 dl/g, before crosslinking.

The pressure-sensitive adhesive is preferably a hot-melt adhesive. A hot-melt adhesive is defined as a solid adhesive that melts to form a fluid adhesive, and is a 100% nonvolatile thermoplastic material.

Preferably, PX has the formula:

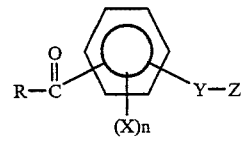

wherein R is lower alkyl or phenyl, provided that R may be optionally substituted with one or more halogen atoms, alkoxy groups or hydroxyl groups, further provided that when R is phenyl substituted with one or more hydroxyl groups any such hydroxyl group is meta or para to the aromatic carbonyl, X is halogen, hydroxyl, or a $C_1$–$C_4$ alkoxy, with any such hydroxyl group being meta or para to the aromatic carbonyl, n is an integer from 0 to 4, Y is a divalent linking group, and Z is an alkenyl group or an ethylenically unsaturated acyl group, with Y and Z having a combined number of carbon atoms of 25 or fewer.

PX is more preferably an acryloxybenzophenone, e.g., para-acryloxybenzophenone.

The adhesive may also include B, an ethylenically unsaturated compound copolymerizable with the monomeric acrylic acid ester. B is used to modify the physical properties of the copolymer. In general, the addition of B will reduce the flexibility of the copolymer. Preferably, B is selected from the group consisting of acrylic acid, methacrylic acid, itaconic acid, acrylamide, methacrylamide, acrylonitrile, methacrylonitrile, vinyl acetate, and N-vinylpyrrolidone. B may be included at levels up to 25% of the total weight of all monomers. A preferred adhesive according to the present invention will contain from about 1% to about 15% by weight of B.

The present invention also provides a method of bonding an annular recording medium disk to a hub that has a circular flange portion, with a crosslinkable hot-melt pressure-sensitive adhesive in between the flange portion and the disk, that comprises the steps of: (A) providing a crosslinkable hot-melt adhesive containing a fluorescent dye; (B) applying a quantity of the crosslinkable adhesive to the flange portion of the hub at a specified application temperature; and (C) using a light detector to measure the presence of adhesive on the flange portion of the hub.

If the light detector detects an improper quantity or distribution of adhesive, including no adhesive at all, the production line may be stopped. The application temperature of the adhesive being dispensed in step B may be adjusted to alter the viscosity of the adhesive so that a proper amount of adhesive flows to the flange portion of the hub. Preferably, the hub is rotated 360° to apply the adhesive to the flange.

DETAILED DESCRIPTION

Figure 1:
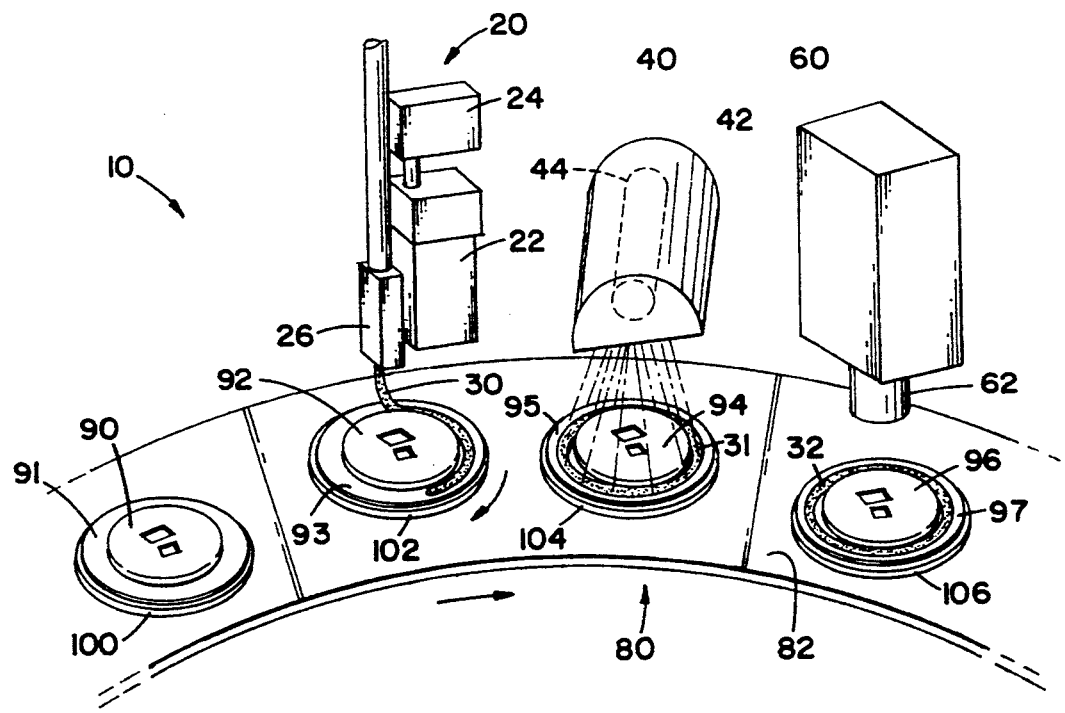
FIG. 1 is a schematic view of an apparatus of the present invention for dispensing adhesive to an article, crosslinking the adhesive, and detecting the amount of adhesive dispensed.

Referring to FIG. 1, an apparatus of the present invention 10 is shown. The apparatus generally includes an adhesive dispenser 20, an ultraviolet energy source 40, a fluorescence detector 60, and a conveyor 80.

The adhesive dispenser 20 includes an adhesive tank 22, a temperature control 24, and a dispensing portion 26.

The ultraviolet (U.V.) energy source 40 includes a deflector 42, and an U.V. lamp source 44.

The fluorescence detector 60 includes fluorescence detecting means 62.

The conveyor 80, as shown, is a portion of a turntable, and includes a support surface 82 upon which hubs 90, 92, 94, and 96 are shown. The hubs have flange portions 91, 93, 95, and 97, respectively. Conveyor 80 includes hub rotating spindles 100, 102, 104 and 106.

The hub 90 is shown with no adhesive provided thereon. The hub 92 is positioned below the adhesive dispenser 20. The hub rotating spindle 102 is engaged and is rotating clockwise while an adhesive bead 30 (typically 3–17 mg) is dispensed from the dispensing portion 26 to flange portion 93 of the hub 92.

The hub 94 having adhesive bead 31 is positioned below the U.V. energy source 40. Preferably adhesive bead 31 is a complete circle without a gap. The U.V. lamp source 44 provides ultraviolet energy that is reflected from the deflector 42 and directed onto the hub 94 to cure the adhesive bead 31 provided on the flange 95.

The hub 96 having adhesive bead 32 is positioned below the fluorescence detector 60. The adhesive beads 30, 31, and 32 include a fluorescent dye that can be detected by the fluorescence detecting means 62.

Figure 2:
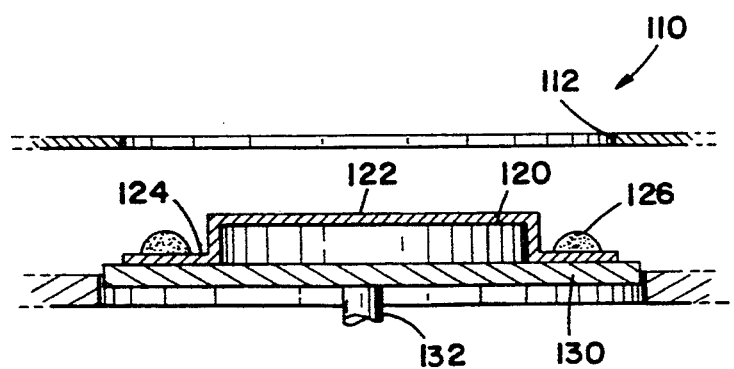
FIG. 2 is a schematic cross-sectional view of a portion of a preferred embodiment of the apparatus of the present invention.

Referring to FIG. 2, a hub 120 is shown. The hub 120 includes a center portion 122, a recessed flange portion 124, and an adhesive 126. A shutter (not shown in FIG. 1) 110 having an aperture 112 permits ultraviolet energy from U.V. source 40 to only strike the hub when it is positioned below the aperture 112. In addition, the speed of the conveyor 80 may be used to regulate the U.V. energy that is provided to each hub. A spindle 130 supports the hub 100 and is rotated by means of a shaft 132.

Adhesive

A pressure-sensitive adhesive, preferably a hot-melt adhesive, is provided on the flange of the hub to bond the disk to the hub. In addition to the preferred hot-melt adhesive, solvent-based adhesives may also be used. Adhesive compositions of the present invention can be prepared from an uncrosslinked, but crosslinkable, copolymer precursor which consists essentially of copolymerized component A and a crosslinking agent, such as PX, and optionally component B (see U.S. Pat. No. 4,737,559). Hot-melt adhesives that are not pressure-sensitive have a limited bonding time available that provides manufacturing difficulties.

The composition of the adhesive and the degree of polymerization of the copolymer are adjusted to obtain the desired degree of shear resistance.

In general, the inherent viscosity of the uncrosslinked adhesive will typically range from about 0.3 to about 1.0 dl/g, preferably about 0.5 to 0.7 dl/g. The test procedure followed and the apparatus that can be used to measure inherent viscosity are described in detail in "Textbook of Polymer Science", F. W. Billmeyer, Wiley-Interscience, Second Edition, 1971, Pages 84 and 85.

A is a monomer that contributes to the viscoelastic properties of the copolymer, i.e., A is a monomeric acrylic or methacrylic acid ester of a non-tertiary alcohol or a mixture of non-tertiary alcohols, said alcohols having from 1 to about 14 carbon atoms with the average number of carbon atoms typically being about 4–12. Examples of such monomers include the esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptanol, 2-octanol, 1-decanol, 1-dodecanol, and the like. Such monomeric acrylic or methacrylic esters are known in the art, and many are commercially available.

PX is a copolymerizable monoethylenically unsaturated aromatic ketone compound free of ortho-aromatic hydroxyl groups, wherein only the ethylenically unsaturated group is copolymerizable with the A, and optionally B, under the polymerization conditions selected to form the copolymer.

Preferred PX monomers are represented by the general formula:

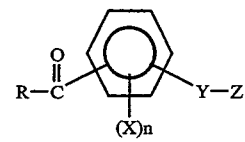

wherein

R is lower alkyl or phenyl, provided that R may be substituted with one or more halogen atoms, alkoxy groups, or hydroxyl groups, X is a halogen, hydroxyl, or $C_1$-$C_4$ alkoxy, n is an integer from 0 to 4, Y is a divalent linking group, preferably selected from the group consisting of a covalent bond, an oxygen atom (—O—), an amino group (—NR'— wherein R' is hydrogen or lower alkyl), an oxyalkyleneoxy group (—O—R"—O— wherein R" is an alkylene group), a carbamoylalkyleneoxy group (—O—R'-—O—C—(O)—N—(R')—R'"—wherein R'" is a covalent bond or an alkyleneoxy group such as —R'-—O—), and Z is alkenyl or ethylenically unsaturated acyl. R', R", R'", and Z include a combined number of carbon atoms of 25 or fewer.

PX is more preferably an acryloxybenzophenone, e.g. para-acryloxybenzophenone. PX is typically present at about 0.025% to 1.0% percent by weight, preferably about 0.1% to 0.5% by weight. When PX is acryloxybenzophenone, it is preferably present at about 0.3% to 0.5% by weight.

B is an ethylenically unsaturated compound copolymerizable with the monomeric acrylic acid ester and is employed to modify the physical properties of the copolymer. In general, the addition of B will reduce the flexibility of the copolymer. B is preferably selected from the group consisting of: acrylic acid, methacrylic acid, itaconic acid, acrylamide, methacrylamide, acrylonitrile, methacrylonitrile, vinyl acetate, and N-vinylpyrrolidone. B may be included at levels up to 25% of the total weight of all monomers.

Synthesis of the above-described PSA's comprising A, PX, and optionally B, is described in U.S. Pat. No. 4,737,559, except that for this invention, the high compliance taught in the '559 patent is not desired. Instead, low creep or high resistance to shear stress is desired, and is obtained by incorporating such monomers, as methylacrylate, or by greater degrees of cross-linking.

After the adhesive has been coated onto the flange of a hub, it is crosslinked or cured by subjecting it to ultraviolet radiation of sufficient intensity, and for a sufficient time, to crosslink the copolymer to the desired degree. The degree of crosslinking is controlled by the amount of PX (or other crosslinker), and by the time and the intensity of the crosslinking U.V. radiation to which the uncrosslinked adhesive is exposed.

Resistance to shear stress (which relates to creep) is related to the extent of crosslinking. Resistance of the adhesive bond to shear stress can be tested by measuring movement between the recording medium and its hub by subjecting the recording medium/hub bond to 50 gram-centimeter (g-cm) torque at 60° C. for 48 hours, and by measuring any variations in 2F modulation.

Modulation is a measurement of the peak voltage variance in reading a standard set of recorded data. Modulation is defined as the positive signal variation from the average signal amplitude. For example, if the average signal amplitude is 6 volts, but within a 5 millisecond time span it rises to 6.6 volts, this would constitute a modulation error of 10%. This type of error causes inaccurate write/read responses. 2F modulation refers to the frequency of the signal written on the recording medium. For purposes of this description, the tracks are written with a signal frequency of 250 kilohertz (2F) on the diskette.

For disks of the present invention it is preferred that 2F modulation shift after shear testing be less then 3%. A shift in modulation is the difference between the initial value of the modulation and the final value of the modulation after the disk is subjected to the shear stress. Movement between the recording medium annulus and the hub of a microfloppy diskette would be indicated by modulation shift, since such movement would cause the tracks to be off center.

The adhesives utilized in the diskettes and methods of the present invention are crosslinkable adhesives, preferably hot-melt adhesives. These adhesives are heated and dispensed in a liquid form and remain tacky for an indefinite period of time, even after cooling. Accordingly, when used on the flange of a diskette hub, the adhesive can be coated at a location remote to the location at which the annular recording medium disk is applied to the hub. However, from a manufacturing standpoint, it is preferable that the recording medium disk be applied to the hub in a continuous process.

The amount of adhesive typically applied to the flange portion of the hub for standard 3.5 inch (89 mm) microfloppy diskettes is about 6–12 milligrams per hub.

Apparatus

The method of the present invention includes an adhesive dispensing device, an ultraviolet light source, and a device that can detect the fluorescent dye present in the adhesive (to be used to calculate the amount of adhesive).

The adhesive is dispensed from a device 20 that typically includes a tank 22 for heating the adhesive prior to dispensing the adhesive, a temperature control means 24 to raise or lower the temperature of the adhesive (to adjust the viscosity of the adhesive), and a dispensing means 26 with a nozzle through which the adhesive 30 is dispensed. The dispensing means will typically have a shut-off device so that adhesive is only dispensed at the appropriate time. Pressure in tank 22 (typically 40 Bar) can be used to control the amount of adhesive dispensed. Temperature of the adhesive when dispensed is typically 165°–175° C. Only a small quantity (e.g. 2 g.) is heated to application temperature; while the bulk of it is held at a lower temperature, e.g. 105° C. The distance between the dispensing device and the hub can be varied to permit uniform deposition of the adhesive on the hub flange.

The dimensions of the nozzle opening and the viscosity of the adhesive can be adjusted so that the adhesive flows from the nozzle at an appropriate rate of flow to deposit the correct amount of adhesive on the flange portion of a hub. It is desirable to rotate the hub 360° to dispense the adhesive around the circumference of the flange. The speed of rotation of the hub will also be variable in determining the desired rate of flow. The Hitachi Hisec "D" machine, commercially available from Hitachi-Setsubi Engineering Co., Ltd. of Ibaraki-Kan, Japan, is an example of an apparatus that provides the means to move hubs on a conveyor-type surface (turntable), and provides the means to rotate an individual hub (spindles), to accommodate dispensing an adhesive to the flange of the hub.

It is preferred that the adhesive be applied to the hub without stringing (formation of an extraneous thread of adhesive at the end of the application step), and a suitable adhesive dispensing device 20 for accomplishing this comprises a combination of a dispensing means or hot melt gun fed by an adhesive handling apparatus including tank 22 and temperature control 24. One such combination found useful consists of a model H201-0.012 zero cavity hot melt gun available from Nordson, Inc. of Atlanta, Ga. and a model PUR-204 adhesive handling apparatus from Meltex Gmbh of Luneburg, Germany D-2120. The nozzle of the gun has a 12 mil (305 micrometer) bore and is oriented at 90° to the workpiece. The parts of the model H201 hot melt gun and the adhesive handling appartus which contact the adhesive are preferably made of materials which will not cause degradation of the adhesive, for example by causing reaction. Thus, aluminum parts of the hot melt gun are preferably coated with plastic. The Meltex adhesive handling apparatus is equipped to receive cans (3.8 l.) and to maintain a nitrogen atmosphere around the adhesive, after a can has been placed in the apparatus. A filter was installed upstream of the dispensing means to remove any impurities from the adhesive.

Ultraviolet energy (U.V.) sources must be of sufficient energy to provide suitable crosslinking of the adhesive. The ultraviolet energy source will preferably include a shutter device with an aperture under which the hubs pass, so that the light can be directed at the adhesive for a desired duration (the length of time the hub resides under the aperture). The U.V. lamp may have an elliptical reflector to allow the workpiece to be in or out of focus depending on its position relative to the lamp thus changing the radiation dose or intensity. One useful exposure time is 2 seconds for each hub. Over-curing of the adhesive can cause degradation of the adhering properties of the adhesive. The Fusion F300, a microwave excited mercury gas lamp, commercially available from Fusion Systems Corporation, Rockville, Md., is a suitable source of ultraviolet energy.

Adhesives used to bond hubs to disketes are typically exposed to 200 to 800 millijoules per square centimeter ($mj/cm^2$), preferably about 250 to 400 $mj/cm^2$. The wavelength of the light is typically 300 to 390 nanometers (nm).

To measure the quantity and placement of adhesive that has been applied to a surface, such as the flange of a hub, a device is used that measures the fluorescence from a dye present in the adhesive. The Erwin Sick Gmbh Electooptic LUT-1-4 and LUT 1-5 scanner devices, commercially available from Erwin Sick Gmbh, of Waldkirch, Germany, are examples of acceptable fluorescence-detecting devices. The fluorescence-detecting device can be calibrated to the particular dye used, and to the amount of dye used in a particular batch of adhesive. Hubs with known amounts of adhesive are measured and the gain of the Sick apparatus is set so that output indicates adhesive weight. The value of a known standard is recorded, using the same fluorescent dye as will be used for diskettes, but the standard can be made using molded polystyrene doped with dye. Small polystyene squares (3 mm×3 mm) are sufficient for calabrations. The scanner device can measure the total weight of adhesive, as well as weight of adhesive at selected positions on a surface, such as a hub.

A measurement can be taken at selected positions around the circumference of a hub (e.g., every 5° or 9°), and the adhesive-coating weight versus degrees of rotation can be plotted. Such a plot will show whether the adhesive is placed uniformly around the flange. A sharp drop in the plot to zero will reflect the absence of adhesive at a particular point. Corrective action can be taken to achieve a uniform distribution of an optimal adhesive-coating weight. For example, the temperature of the dispensed adhesive (viscosity), the speed of rotation of the hub, the dispense time, and the size of the nozzle can be adjusted to achieve an optimal coating weight and distribution of adhesive. Preferably, a data acquisition system, software package, can provide the means for controlling adhesive dispensing conditions. Such systems, programmable for specific processes, are commercially available.

Dye

The dyes used in the adhesive formulations of the present invention include any suitable dye that does not interfere with the adhesive properties of the adhesive, and that can be detected with the particular device selected to measure the fluorescence. The dye is typically present at about 0.001 to 0.1 percent by weight, but may be present in any concentration that permits detection.

Fluorescent dyes, as used herein, include: uvescers (dyes which flouresce in the U.V. region of the electromagnetic spectrum), such as those described in U.S. Pat. No. 4,922,113, that typically absorb radiation in the range of 240 to 400 and emit radiation in the range of 290 to 430; fluorescent dyes, such as those described in U.S. Pat. No. 3,675,015, typically absorbing radiation in the range of 250 to 400 and emiting visible light (above 400); and any other suitable dye that is capable of being detected by the detection device that is used.

Dyes used in the adhesives of the present invention should be capable of being stably dispersed into a functional adhesive (i.e., dissolved or finely divided such that on dispersing in an adhesive a solution or suspension is formed from which less than 10% by weight of the particles settle out in 24 hours); preferably, the dyes are soluble in the adhesive.

CALCOFLUOR ®, an aminocoumarin dye ($C_{14}H_{12}O_2N$), commercially available from American Cyanamid Corporation, is an example of a preferred dye.

EXAMPLE 1

An adhesive of the present invention was made as follows. 177.36 g of ethyl acetate was added to a 1 liter split-resin flask fitted with a condenser, addition funnel, glass stir rod with half-moon Teflon blade, and a mechanical stirrer. Heat was provided by a mantle connected to a variable voltage source. A mixture of 153.12 g isooctyl acrylate, 49.5 g methyl acrylate, 16.5 g acrylic acid, 3.52 g acryloxy benzophenone (25% in ethyl acetate), and 0.73 g VAZO 64 AIBN initiator was made. 55 g of the mixture were added to the flask and agitated at 150 rpm.

The mixture was heated to reflux, and the remaining portion of the mixture was added dropwise into the flask, through an addition funnel, over a period of 60 minutes. The agitation was increased to 350 rpm and the contents were allowed to reflux gently for three more hours.

The flask was cooled to room temperature, and gravimetric solids and inherent viscosity testing were then carried out. The percent solids was 54.9% while the inherent viscosity was measured at 0.62 (in ethyl acetate). The Brookfield viscosity=20,600 centipoise (cps) at 416 revolutions per minute (rpm). The solvent was removed from the adhesive to prepare the adhesive for coating.

EXAMPLE 2

An adhesive of the present invention was made by the process of Example 1. The adhesive copolymer was derived from 69.6 g isooctylacrylate, 22.5 g methylacrylate, 7.5 g acrylic acid, and 0.4 g of acryloxy benzophenone. The adhesive had an inherent viscosity of 0.60 dl/g. 8 mg of the adhesive was applied to a hub flange with a diameter of 29 mm and crosslinked with 400 $mj/cm^2$ of ultraviolet energy. A 1 Megabyte (Mb) $3\frac{1}{2}''$ diskette was mounted to the hub with about 900 g units of force. The medium-to-hub movement was tested at 50 g-cm torque at 60° C. for 48 hours and measured for 2F Signal modulation. The center shift of the recording medium was 0.006 mm, and the modulation shift was 1.5%. A preferred combination is the same adhesive as described in Example 2 but using 250 $mj/cm^2$ for crosslinking U.V. exposure.

EXAMPLE 3

An adhesive of the present invention was made by the process of Example 1. The adhesive was similar to that of Example 2, but its inherent viscosity was 0.75 dl/g. 9.5 mg of the adhesive was applied to a hub flange with a diameter of 29 mm and crosslinked with 400 mj/cm² of ultraviolet energy. A 1 Mb 3½″ diskette was mounted to the hub with about 900 grams of force. The medium-to-hub movement was measured as described in Example 2. The center shift of the medium was 0.007 mm and the modulation shift was 2.0%.

To incorporate a fluorescent dye into the adhesive, a suitable dye, as described above, can be added to the adhesive as prepared by the procedure of Example 1. The solvent removal after adhesive synthesis is interrupted, and the dye is added to the solvent adhesive mixture, typically at the proportion of 0.03 weight percent of the solids present. It is mixed with the adhesive, and then the solvent removal is completed.

While certain representative embodiments and details have been discussed above for the purpose of illustrating the invention, it will be apparent to those skilled in this art that various changes and modifications may be made in this invention without departing from its true spirit or scope which is indicated by the following claims.

What is claimed is:

1. A recording diskette comprising an annular recording medium disk having a top surface and a bottom surface, and a hub having a circular flange portion, bonded to the disk with a pressure sensitive adhesive, wherein the adhesive comprises:
   a crosslinked pressure-sensitive adhesive comprising a crosslinked copolymer including, as monomers, A and a crosslinking agent wherein:
   A is a monomeric acrylate or methacrylate ester of a non-tertiary alcohol or a mixture of non-tertiary alcohols, said alcohols having from 1 to about 14 carbon atoms; and
   the crosslinking agent is PX, a copolymerizable mono-ethylenically unsaturated aromatic ketone monomer substantially free of ortho-aromatic hydroxyl groups; the copolymer being crosslinked by means of PX; wherein PX monomer units are present in the copolymer in a proportion of about 0.025 to about 1.0% by weight of said copolymer.

2. The diskette of claim 1 wherein PX has the formula:

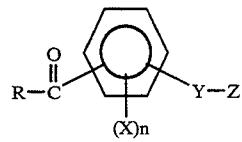

wherein R is lower alkyl or phenyl, provided that R may be optionally substituted with one or more halogen atoms, alkoxy groups or hydroxyl groups, further provided that when R is phenyl substituted with one or more hydroxyl groups, any such hydroxyl groups are meta or para to the aromatic carbonyl, X is halogen, hydroxyl, or $C_1$–$C_4$ alkoxy provided that when X is a hydroxyl group, that X is meta or para to the aromatic carbonyl, n is an integer from 0 to 4, Y is a divalent linking group, and Z is an alkenyl group or an ethylenically unsaturated acyl group, Y and Z have a combined number of carbon atoms of fewer than 25.

3. The diskette of claim 1 wherein PX is present in an amount of from 0.1 to 0.5% by weight.

4. The diskette of claim 3 wherein the inherent viscosity of the copolymer is 0.5 dl/g to 0.7 dl/g.

5. The diskette of claim 1 wherein the adhesive further includes B, an ethylenically unsaturated compound copolymerizable with A, wherein B is present in an amount of from 1 to 25% by weight.

6. The diskette of claim 5 wherein B is selected from the group consisting of: acrylic acid, methacrylic acid, itaconic acid, acrylamide, methyacrylamide, acrylonitrile, methacrylonitrile, vinyl acetate, and N-vinylpyrrolidone.

7. The diskette of claim 6 wherein PX is acryloxybenzophenone present in an amount of 0.3% to 0.5% by weight and the copolymer inherent viscosity is 0.5 dl/g to 0.7 dl/g.

8. A recording diskette comprising an annular magnetic recording medium disk having a top surface and a bottom surface, and a hub having a circular flange portion, bonded to the disk with a crosslinked pressure-sensitive hot-melt adhesive.

* * * * *